March 28, 1944.  J. C. RHOADS  2,345,428
ELECTRIC CURRENT COLLECTOR
Filed Oct. 26, 1942
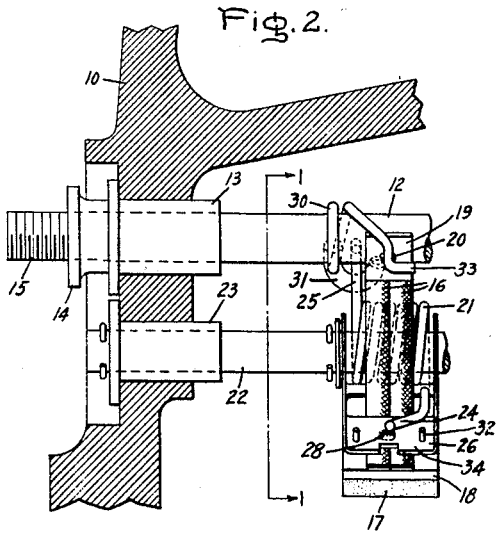
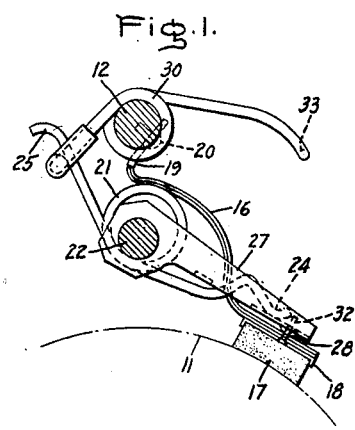
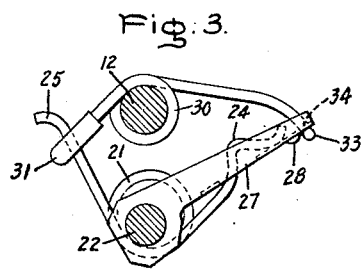
Inventor:
James C. Rhoads,
by Harry E. Dunham
His Attorney.

Patented Mar. 28, 1944

2,345,428

UNITED STATES PATENT OFFICE 2,345,428

ELECTRIC CURRENT COLLECTOR

James C. Rhoads, Erie, Pa., assignor to General Electric Company, a corporation of New York Application October 26, 1942, Serial No. 463,321

7 Claims. (Cl. 171—324)

My invention relates to electric current collectors, such as are used with dynamo-electric machines which are provided with commutators or slip rings.

An object of my invention is to provide an improved current collector of the type used for providing electrical contact with a commutator or slip ring.

Another object of my invention is to provide an improved electric contact brush rigging of the type used as a current collector in dynamo-electric machines.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a sectional view taken along line 1—1 of Fig. 2 illustrating an embodiment of my improved current collector; Fig. 2 is a side elevational view, partly broken away, of a dynamo-electric machine end shield provided with an embodiment of my improved current collector; and Fig. 3 is a view similar to Fig. 1 illustrating the position of the brush biasing pressure finger out of engagement with the brush to facilitate inspection and changing of brushes.

Referring to the drawing, I have shown an embodiment of my improved electric current collector mounted in an end shield 10 of a dynamo-electric machine and adapted to supply current to a commutator 11 schematically illustrated by a dash line in Fig. 1. The current collector brush rigging includes a contact brush to which current is supplied from a source of electric power supply through a terminal stud 12 mounted in the end shield 10 and supported therein by an electrically insulating bushing 13 arranged in an opening in the end shield 10. The terminal stud 12 is held in position by a nut 14 which threadedly engages the outer end 15 thereof, and the source of electric power supply is adapted to be connected to the stud 12 by securing a terminal to the stud threaded end 15. Current is supplied from the stud 12 to a contact brush through a pigtail or flexible electrical conductors 16 formed of four braids of electrically conductive material which are secured to a brush contact element 17 by a terminal plate or cap 18 arranged over one end of the contact element 17. The contact element may be made of any suitable material, such as silver-graphite, and the pigtail 16 forms a good electrical contact with the terminal plate 18 by being welded to the outer side thereof. The end of the pigtail 16 opposite the contact element 17 is secured to a terminal plate 19 in any suitable manner, as by soldering, brazing, or clamping, and is electrically connected to the terminal stud 12 by a screw 20 which extends through an opening in the terminal plate 19 and is screwed into the stud 12.

The brush contact element 17 is adapted to be biased into good electrical contact with the commutator 11 by a coil spring element 21 which is loosely arranged about a mounting stud or rod 22 supported by an insulating bushing 23 in an opening in the end shield 10. The ends 24 and 25 of the spring 21 extend outwardly in opposite directions and the end 24 of the spring 21 is adapted to press against the contact element 17 and is bent angularly over a transversely extending pressure plate portion 26 of a U-section pressure finger member 27. Each of the two side portions of the pressure finger 27 is formed with an opening therein arranged over the supporting rod 22 to provide a pivotal mounting for the pressure finger on this rod. Pressure is applied to the pressure plate portion 26 of the finger by the spring 21 and to the brush 17 for biasing the brush toward the commutator through a spherical or rounded surface pressure contact point element 28 which permits the brush to move or rock in all directions to follow the commutator surface very closely. This contact point 28 is located substantially so that the force resulting from the radial reaction of the commutator against the brush combined with the frictional drag on the brush due to the rotation of the commutator, referred to the center of the brush, passes substantially through the point of contact 28. This places the contact point 28 slightly to one side of the center of the pressure plate 26 toward the trailing edge of the brush. With this arrangement, the brush exerts substantially uniform pressure against the commutator at both the leading and trailing edges and will have an essentially even rate of wear. This is possible mainly because of the relatively short brush. This contact point feature is not my invention, but is the invention of Max R. Hanna and is described and claimed in his copending application, Serial No. 463,322, filed October 26, 1942. The pressure of the spring 21 is obtained by engagement of the outer end 25 of the spring 21 with a curved end 29 of a supporting coil spring 30, which is loosely mounted about the terminal stud 12. The ends of this spring 30 extend outwardly in opposite directions and are used as stop or retaining elements for the spring end 25 and the pressure finger 27. In order to prevent the passage of current through the springs 21 and 30, an insulating sleeve 31 is arranged over the curved end 29 of the spring 30 to insulate these two springs from each other. The contact element 17 is held in its desired position with respect to the pressure finger 27 by a pair of locating pins 32 arranged one on each side of the braided pigtail 16 and secured to the contact element 17 by being affixed to the upper side of the terminal plate 18. These pins 32 are adapted to extend through openings formed in the pressure plate 26 of the pressure finger member 27.

When it is desired to inspect or replace a contact brush member, the pressure finger 27 may be lifted to the position shown in Fig. 3, and an outturned end 33 of the spring 30 away from the insulated end 29 may be hooked under a tab 34 formed on the outer edge of the pressure plate 26 to hold the pressure finger away from the commutator. This construction provides a contact brush rigging in which a brush may be very readily replaced or removed for inspection merely by lifting the pressure finger 27 as stated above, which releases the pins 32 from the socket holes in the pressure finger, and disconnecting the end of the pigtail 19 by unscrewing the screw 20 from the stud 12. A brush also may be very easily placed in position by merely screwing the screw 20 through the terminal plate 19 to the stud 12, and then placing the contact element 17 in position on the commutator with the pins 32 arranged in sockets of the pressure finger 27.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An electric current collector including a pressure finger adapted to engage a contact element, means including a rod for pivotally supporting said pressure finger, a terminal stud, a coil spring with the ends thereof extending outwardly in opposite directions and being mounted about said terminal stud, and means including a second coil spring with the ends thereof extending outwardly in opposite directions and being mounted around said rod with one end in engagement with one end of said first-mentioned spring and the other end thereof normally adapted to be arranged in engagement with said pressure finger for exerting a biasing pressure on said pressure finger.

2. An electric current collector including a pressure finger adapted to engage a contact element, means for pivotally supporting said pressure finger, means including a biasing coil spring with the ends thereof extending outwardly in opposite directions and being arranged about said pivotal supporting means with one end normally adapted to be arranged in engagement with said pressure finger for exerting a biasing pressure on said pressure finger, and means including a terminal stud and a coil spring with the ends thereof extending outwardly in opposite directions and being arranged about said terminal stud for providing retaining elements for the ends of said biasing spring.

3. An electric current collector including a pressure finger adapted to engage a contact element, means including a rod for pivotally supporting said pressure finger, a coil spring with the ends thereof extending outwardly in opposite directions, means for supporting said coil spring, and means including a second coil spring with the ends thereof extending outwardly in opposite directions and being arranged around said rod with one end in engagement with one end of said first-mentioned coil spring and the other end thereof normally adapted to be arranged in engagement with said pressure finger for exerting a biasing pressure on said pressure finger.

4. An electric current collector including a contact element, a pressure finger having a portion arranged to engage said contact element, means including a rod for pivotally supporting said pressure finger, a terminal stud, means for electrically connecting said terminal stud to said contact element, a coil spring with the ends thereof extending outwardly in opposite directions and being arranged about said terminal stud, and means including a second coil spring with the ends thereof extending outwardly in opposite directions and being arranged about said rod with one end in engagement with one end of said first-mentioned spring and the other end thereof normally adapted to be arranged in engagement with said pressure finger for exerting a biasing pressure on said contact element through said pressure finger.

5. An electric current collector including a contact element, a pressure finger having a portion arranged to engage said contact element, means including a rod for pivotally supporting said pressure finger, a coil spring with the ends thereof extending outwardly in opposite directions, means for supporting said coil spring, and means including a second coil spring with the ends thereof extending outwardly in opposite directions and being arranged about said rod with one end in engagement with one end of said first-mentioned coil spring and the other end thereof normally adapted to be arranged in engagement with said pressure finger for exerting a biasing pressure on said contact element through said pressure finger, the other end of said first-mentioned spring being adapted to engage an end of said pressure finger for holding said pressure finger out of engagement with said contact element.

6. An electric current collector including a pressure finger adapted to engage a contact element, means including a rod for pivotally supporting said pressure finger, a terminal stud, a coil spring with the ends thereof extending outwardly in opposite directions and being arranged about said terminal stud, and means including a second coil spring with the ends thereof extending outwardly in opposite directions and being arranged about said rod with one end in engagement with one end of said first-mentioned spring and the other end thereof normally adapted to be arranged in engagement with said pressure finger for exerting a biasing pressure on said pressure finger, the other end of said first-mentioned spring being adapted to engage an end of said pressure finger for holding said pressure finger out of engagement with the contact element.

7. An electric current collector including a contact element, a pressure finger having a portion arranged to engage said contact element, means including a rod for pivotally supporting said pressure finger, a terminal stud, means for electrically connecting said terminal stud to said contact element, a coil spring with the ends thereof extending outwardly in opposite directions and being arranged about said terminal stud, and means including a second coil spring with the ends thereof extending outwardly in opposite directions and being arranged about said rod with one end in engagement with one end of said first-mentioned spring and the other end thereof normally adapted to be arranged in engagement with said pressure finger for exerting a biasing pressure on said contact element through said pressure finger, the other end of said first-mentioned spring being adapted to engage an end of said pressure finger for holding said pressure finger out of engagement with said contact element.

JAMES C. RHOADS.